U S006274949B1

United States Patent
Lioux et al.

(10) Patent No.: US 6,274,949 B1
(45) Date of Patent: Aug. 14, 2001

(54) BACK-UP POWER ACCESSORY FOR A COMPUTER

(75) Inventors: Bernard Lioux, St Nizier d'Uriage; Jean-Michel Combe, Domène, both of (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/327,097

(22) Filed: Jun. 7, 1999

(30) Foreign Application Priority Data

Jan. 18, 1999  (EP) .................................................. 99400174

(51) Int. Cl.⁷ ....................................................... G06F 1/30
(52) U.S. Cl. ............................................. 307/64; 713/300
(58) Field of Search ........................ 307/64, 66; 713/322, 713/323, 324, 300

(56) References Cited

U.S. PATENT DOCUMENTS

| | | | |
|---|---|---|---|
| 4,675,538 | * 6/1987 | Epstein ..................................... | 307/64 |
| 4,860,185 | 8/1989 | Brewer et al. . | |
| 5,289,045 | 2/1994 | Lavin et al. . | |
| 5,315,161 | * 5/1994 | Robinson et al. ...................... | 307/66 |
| 5,410,713 | * 4/1995 | White et al. .......................... | 395/750 |
| 5,428,252 | * 6/1995 | Walker et al. .......................... | 307/64 |
| 5,532,524 | * 7/1996 | Townsley et al. ...................... | 307/64 |
| 5,557,738 | * 9/1996 | Townsley et al. ...................... | 307/66 |
| 5,603,038 | 2/1997 | Crump et al. . | |
| 5,636,109 | 6/1997 | Carroll . | |
| 5,717,936 | * 2/1998 | Uskali .................................... | 307/66 |
| 5,748,972 | 5/1998 | Clark et al. . | |
| 5,825,100 | * 10/1998 | Kim ....................................... | 307/64 |
| 5,923,099 | * 7/1999 | Bilir ...................................... | 307/64 |
| 5,958,054 | * 9/1999 | O'Connor et al. ..................... | 713/300 |
| 5,962,930 | * 10/1999 | Cluff et al. ............................ | 307/66 |
| 6,049,884 | * 4/2000 | Tsuji ..................................... | 713/323 |

FOREIGN PATENT DOCUMENTS

| | | |
|---|---|---|
| 0 594 972 | 5/1994 | (EP) . |
| 2 262 170 | 6/1993 | (GB) . |
| WO95/17777 | 6/1995 | (WO) . |
| WO98/34314 | 8/1998 | (WO) . |

* cited by examiner

*Primary Examiner*—Josie Ballato
*Assistant Examiner*—Roberto Rios

(57) ABSTRACT

A back-up power accessory is described for storing back-up power for a computer and for providing the computer with the back-up power for a limited period of time upon failure of an AC power supply to the computer, the accessory being electrically connectable to the computer and including a first detection mechanism for detecting AC power failure of said computer; a second detection mechanism for receiving a suspend signal from the computer which signal indicates that the computer is in a power consuming sleep state; a third detection mechanism for receiving an on/off signal from the computer which on/off signal indicates that the computer requires full power; and a shutdown mechanism that cooperates with said first, second and third detection mechanisms upon AC power failure and detection of either the suspend signal or the on/off signal to send a fail signal to the computer for causing the computer to perform a safe shutdown.

15 Claims, 3 Drawing Sheets

BACK-UP POWER ACCESSORY FOR A COMPUTER

FIELD OF THE INVENTION

The invention relates to back-up power accessories for computers, particularly for personal computers, and to computer systems adapted to receive such back-up power accessories.

BACKGROUND OF THE INVENTION

Various types of devices are known that function to provide back-up power to computers when mains power fails, generally using energy stored in batteries. Such devices can be internal or external to the computer and are sometimes known as uninterruptible power supplies (UPSs) or battery back-up units (BBUs). Examples of these devices can be found described for instance in WO95/17777, GB2262170 and WO98/34314.

Typically, commercially available such UPS devices that are designed for use with modern personal computers are either in the form of a plug-in card for installation within the computer or a external device which is connectable in series with the power lead.

Usually, such devices alert the user to a power failure via some kind of on-screen message, the communication between the device and the computer being carried out via one of the computer's serial ports.

Whilst this arrangement is generally satisfactory it does present certain drawbacks in practice. First, the serial ports of a computer are a scarce resource and if one is taken up by an UPS device, then that port is not available for other connections. Second, the devices require a dedicated driver program to be developed to interface them with the operating system. Thirdly, the user may not notice or may be away from the computer when they are warned of a power failure.

Power management, and essentially power saving is becoming an important concern for computer manufacturers, inter alia for environmental reasons. Increasingly, modern personal computers include power management features that allow the computer to enter various power saving states. Generally, a modern personal computer has at least four different states with different patterns of power consumption.

In a first state, the computer is off and unplugged, and the power consumption is nil. In a second state, the computer is OFF but the power supply unit is connected to the mains power supply and the computer may be woken by a signal received via a computer network. Power supplies typically provide a low level (less than 5 watts) of auxilliary power in this state. A third state is of course the ON state, with the computer working normally.

In addition, at least one power consuming sleep or standby mode—a fourth state—is also generally provided. In such sleep modes, the functionalities of the computer are degraded, but the computer may be relatively rapidly restored to the ON state. In such sleep states, at least some data recording the state of the system when in entered the sleep state is generally stored in dynamic memory. For this reason, such states are sometimes referred to as 'suspend to RAM'. Auxilliary power is also provided in these states.

The computer passes from the second state to the third state when the ON/OFF button of the computer is activated to switch the computer on. The computer passes from the third state to the fourth state in certain predefined conditions, for instance when it has been inactive for a certain programmed period of time. The computer passes from the fourth state—sleep mode—to the third state—ON—when the computer is subsequently woken up. This may for instance be the case when the user presses a key on the keyboard of the computer.

The trend in PC design, as expressed for example in the ONNOW initiative promoted by Microsoft Corp. is to arrange the system so that it is supplied with power for long periods of time, but is placed into a low power sleep or standby state when not in use, rather than being switched off. It is therefore to be expected that the chance of the PC being in some kind of sleep or standby state when a power failure occurs is quite high in practice.

EP-A-0805386 A1 proposes a system in which a power supply includes an internal power source. When the system is in a normal operating state or a lower power consumption standby state and external power is disrupted, the power supply is operative to generate a control signal to power management circuitry and switch to the internal power source. The power management circuitry causes the computer to change to a suspend state in which the entire state of the system is saved to a non-volatile storage device.

This invention is intended to mitigate the drawbacks of the above-described prior art by providing a convenient and low cost back-up power accessory for a computer which serves to enable the computer to be safely shutdown in the event of a power failure whatever its operating state at the time of the power failure and which has reduced impact on the manufacturing cost of the computer for which it is intended.

SUMMARY OF THE INVENTION

In brief, this is achieved by a back-up power accessory for storing back-up power for a computer and for providing the computer with said back-up power for a limited period of time upon failure of an AC power supply to the computer, the accessory being electrically connectable to the computer. A first detection mechanism is provided in the accessory for detecting AC power failure of said computer. A second detection mechanism is provided for receiving a suspend signal from the computer that indicates that the computer is in a power consuming sleep state and a third detection mechanism is provided for receiving an on/off signal from the computer that indicates that the computer requires full power. Finally a shutdown mechanism cooperates with said first, second and third detection mechanisms upon AC power failure and detection of either the suspend signal or the on signal to send a fail signal to the computer for causing the computer to perform a safe shut-down.

The invention is, at least in part, based on the recognition that the existing signals within the computer that serve to control the provision of main and auxilliary power to the system can also be used, together with suitable detection and control functionality within the accessory, to provide convenient and sufficient control signals to enable a back-up power accessory to manage a safe system shutdown upon AC power failure.

Since the additional detection and control functionality is provided within the accessory and not by the computer, the impact on the manufacturing cost of the computer for which the accessory is intended is reduced.

In a preferred embodiment, the first detection mechanism includes means to detect AC failures lasting at least a predefined length of time and the shutdown mechanism is arranged to send the fail signal if an AC power failure longer than the predetermined length of time is detected. This enables the system to withstand very short power failures without shutting down.

The accessory can comprise a connector for providing an electrical connection with a power management control component of the computer, the connector comprising at least a first wire for carrying the suspend signal, a second wire for carrying the on/off signal and a third wire for carrying the fail signal.

In preferred embodiments, the connector consists of four wires, including an earth wire.

Suitably, the accessory can be physically configured for removable mounting within a computer case, for example it can be shaped and sized like a conventional disk drive accessory and comprise means to fasten the accessory within a conventional disk drive bay of the computer.

BRIEF DESCRIPTION OF THE INVENTION

A system embodying the invention will now be described, by way of non-limiting example, with reference to the accompanying drawings, in which FIG. 1 shows a computer system including a battery backup unit;

BEST MODE OF CARRYING OUT THE INVENTION

Figure 1:
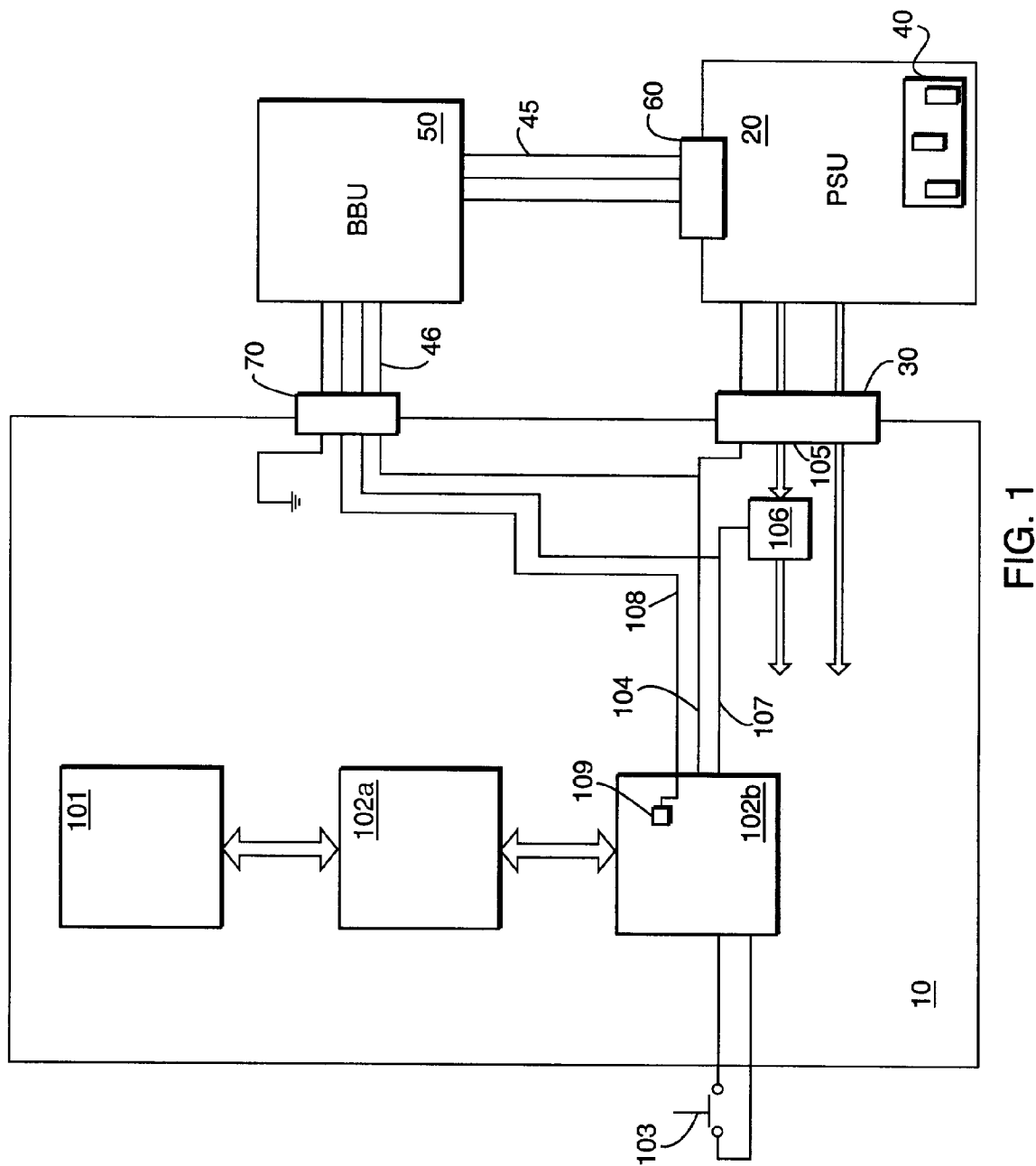

FIG. 1 shows in schematic form a computer system including a battery back-up unit. A personal computer system including motherboard 10 is powered by a power supply unit (PSU) 20 connected thereto by a conventional power connector 30. PSU 20 receives AC mains power through connector 40. Battery back-up (BBU) accessory 50 is connected to PSU 20 to provide back-up electrical power over link 45 in the event of a failure in AC power supply 40. BBU 50 is connected to motherboard 10 via link 46 in a manner to be described in more detail below.

It will, of course, be understood by those skilled in the art that the physical connections described to motherboard 10 may in practical implementations be made to a separate riser card, which itself is connected to motherboard via a single standard connection.

In one embodiment, BBU 50 has the mechanical dimensions to fit in a 5.25" computer chassis shelf form factor in the manner described for instance in WO95/17777. Of course, other accessory form factors could equally be used.

BBU 50 is designed to ensure a battery back-up for 3 minutes only to the system board 10 with a maximum power of 150W and is able to be connected to a conventional PSU 20 working both with 115 Vac and 230 Vac input voltages. When activated, BBU 50 allows PSu to deliver PGOOD and all the PSu normal output voltages including VSB. As will be clear from the description that follows, the BBU does not need to be able to power the computer monitor.

The details of the power storage aspects of BBU 50 are not material to the present invention and so will only be described briefly here.

BBU 50 is connected on the primary side of PSU 20 through a safety connector 60 located on the same side of the PSU casing as all the secondary output cables. The voltage inside of the connection cable is 300Vdc. The connector on the PSU 20 is female to avoid the possibility that the end user be in contact with bulk caps high voltage.

As a further safety feature, a third pin is used in safety connector 60 to by BBU 50 to detect the presence of the PSU. If the PSU is not detected as being present, it is ensured that no DC voltage is present at the male output of connector 60. The connection cable between the BBU and the PSU is double isolated for safety.

BBU 50 includes a battery and an associated charging circuit. Whenever the AC input is applied to PSU 20, BBU 50 provides a 'trickle charge' current to the battery.

BBU 50 has an internal detection of AC Line failure which enables or disables battery operation. When AC line failure is detected, BBU 50 provides DC power to the primary side of PSU 20 so that, for a limited time PSU 20 provides output voltages identical to those normally provided by PSU 50.

A switch located on an externally accessible front panel of BBU 50 is provided to allow convenient computer maintenance to the end user. When this switch is OFF, no voltage is applied on output connector 60. This switch is of course not essential.

In order to understand the functioning of connection 70 between BBU 50 and motherboard 10, a description will now be given of some of the main components of motherboard 50.

As is conventional, motherboard 10 includes a CPU 101 and a core-logic chipset which is in two parts 102a and 102b. As is well known, first part 102a includes memory control functionality to manage access to main system memory (not shown) and CPU 101 as well as an AGP interface to handle communication to a graphics subsystem (not shown). The second part 102b of the core logic chipset includes functionality to manage access to expansion slots (not shown) via a PCI bus as well as certain power management functionality, including an on/off controller.

In particular, component 102b includes a connection to the external on/off switch 103 and an output 104 which provides a remote on/off signal to PSU 20. As is conventional PSU 20 includes switching logic for switching off the power, other than auxiliary power, supplied to motherboard 10 (as well as to other system components) in response to remote on/off signal 104.

As long as PSU 20 is plugged into a mains wall socket and is supplied with AC power, PSU 20 supplies auxiliary power via lines 105. This auxiliary power is supplied in order to power vital system components such as main system memory.

The embodiment of the invention uses a processor and corresponding core logic chipset available from Intel Corporation. Details of these devices form no part of the present invention but can be found in documents available from Intel Corporation.

The supply of auxiliary power to such system components is controlled via switching logic 106 located on motherboard 10. Switching logic 106 is in turn controlled by a signal 107 supplied from chipset component 102b. Signal 107 serves to indicate whether or not the system is in a suspend to RAM state so that supply of auxilliary power to system memory is required, or whether the system is in an off state so that supply of power to system memory is not required—in which event switching logic 106 will cut off the supply of auxilliary power to motherboard 10.

In order to control the operation of BBU 50 the signals on lines 104 and 107 are supplied also to BBU 50 via connection 70.

To indicate that the AC power has failed and to initiate appropriate action by the system, BBU 50 supplies via connection 46 a signal 108—also denoted AC_Good—to chipset component 102b. A ground connection is also provided between BBU 50 and motherboard 10.

The connection 46 and connector 70 therefore comprises only 4 wires and is connected to motherboard 10 using a keyed 4 pin connector:

Pin 1 : Remote ON (sent FROM the system)
Pin 2 : S3 Bit detection (sent FROM the system)
Pin 3 : GROUND
Pin 4 : AC_GOOD (sent TO the system)

A keyed connector is advantageous to avoid any connection error. A suitable connector would be MOLEX Ref. 51103-0300 or equivalent.

Figure 2:
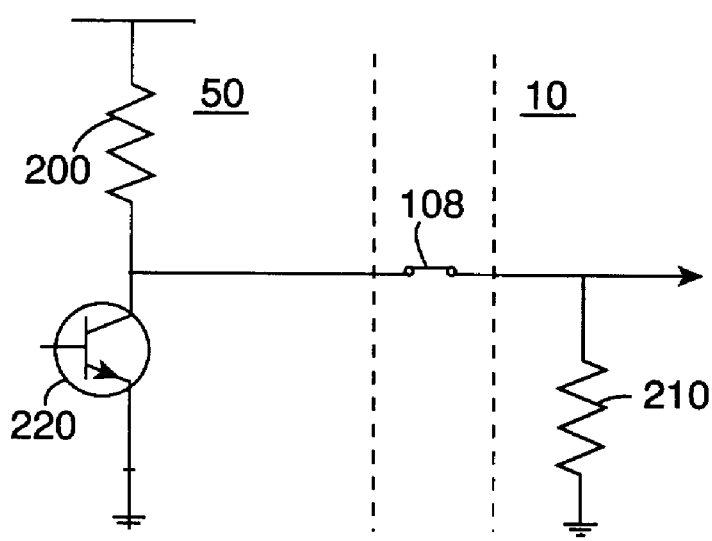
FIG. 2 shows a presence detect circuit in the system of FIG. 1.

The AC_Good signal on line 108 is sent to a general purpose input provided in chipset component 102b through the simple presence detect circuit shown in FIG. 2. This circuit enables chipset component 102b to detect the presense of the BBU connector 70. In detail, AC_Good signal 108 is delivered on a pulled up output. Pull up resistor 200 is calculated so that signal high level voltage will be 3.3V. Pull down resistor 210, which is located on motherboard 10, can be, for example, 10 KOhms. If BBU 50 is not connected at connector 70 then the voltage on the input pin of chipset component 102b will be pulled low by resistor 210. If BBU 50 is connected at connector 70, the voltage on the input pin of chipset component 102b will be high, but may be driven low by switching on transistor 220.

Figure 3:
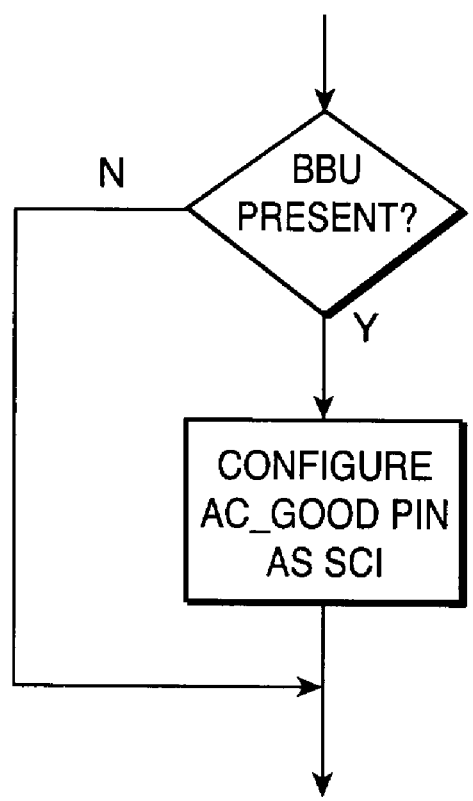
FIG. 3 is a flow diagram showing part of an operating system initialisation process.

The presence of BBU 50 connector 70 is detected at system boot-up by system BIOS using presence/absence of signal 108 during operating system initialization. If BBU 50 is detected as present the BIOS is arranged to configure the input pin of chipset component 102b to provide a system controlled interrupt by writing in certain registers, indicted at 109 within the chipset, upon this pin being driven low. This part of the BIOS operating system initialisation process is illustrated in the flow chart of FIG. 3. It will be understood by those skilled in the art that this task could equally be carried out during a Power On Self Test (POST)Process.

The Microsoft Windows 98 or NT5 operating system running on the system is warned of changes in SCI registers 109 and reacts with high priority to re-enter BIOS upon detecting such a system controlled interrupt. The BIOS includes a dedicated handler routine arranged to prompt the operating system to perform a safe shutdown in this event.

The details of the operation of the Microsoft Windows operating systems can be found in publications available from Microsoft Corporation and form no part of this invention.

Figure 4:
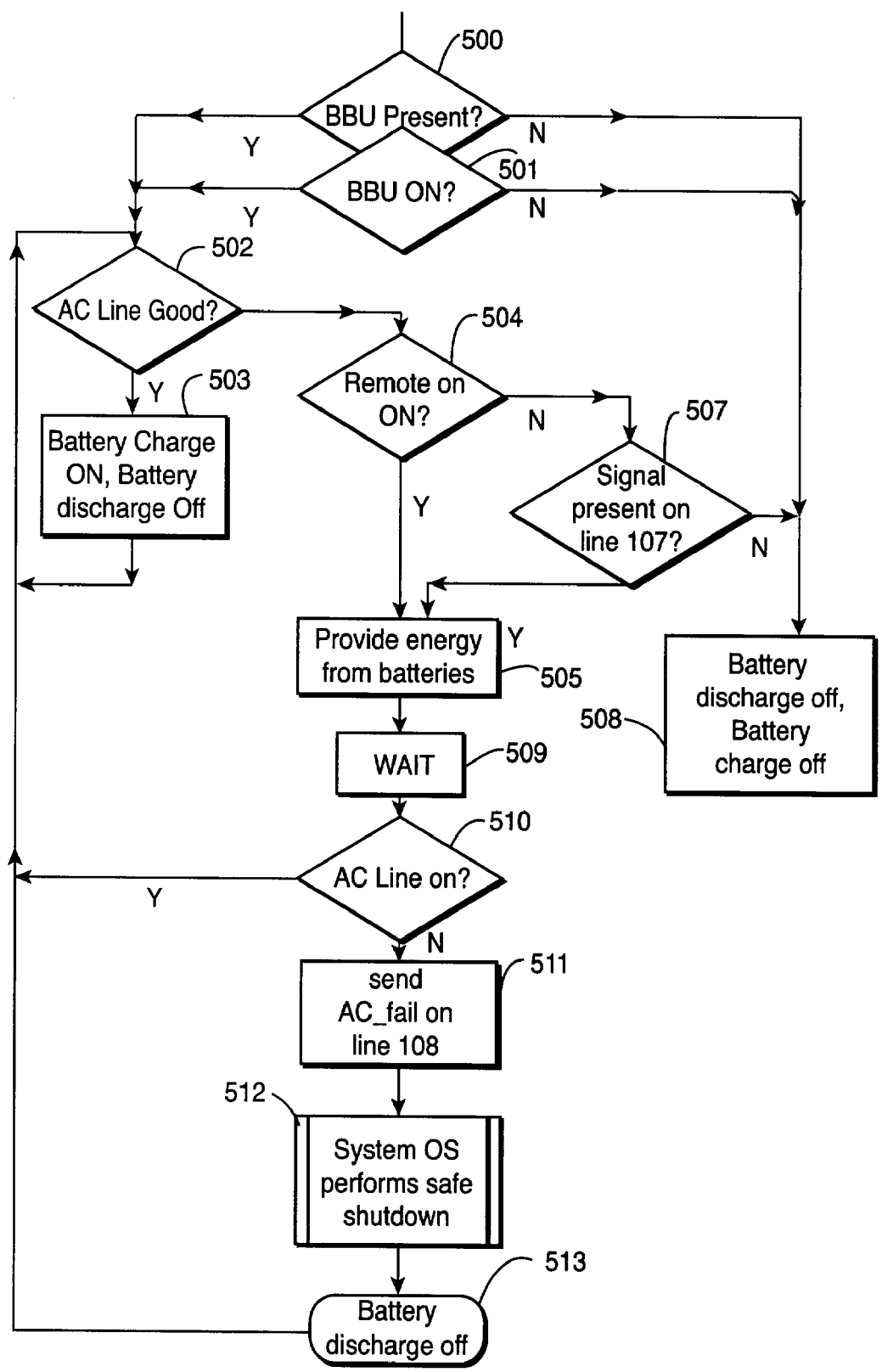
FIG. 4 is a flow diagram illustrating operation of a battery back up unit.

FIG. 4 is a flowchart showing the operation of BBU 50.

In steps 500 and 501 checks are made to see if the BBU is present and switched on. Repeated checks are then made to see if the AC line is good (see step 502). If the AC line is good then the battery is set to charge, step 503. If the AC line is not good, then it is checked in step 504 whether the remote on signal on line 104 is present. If the remote on signal is present on line 104 then BBU 50 is set to provide power to PSU 20 from its batteries, step 505. If the remote on signal on line 104 is not present, line 107 is checked in step 507 to see whether any signal is present indicating that the system requires auxilliary power. If such a signal is present on line 107 then BBU 50 is also set to provide power to PSU 20 from its batteries and control passes to step 505. If no signal is present on line 107, then the BBU is switched off entirely—step 508.

Following step 505, within which BBU is supplying power to PSU 20, the BBU enters a short wait state in order to test whether the power failure will last. This wait time is selected so that during this time the capacity of the BBU batteries is not significantly drained so that enough power remains to enable the system subsequently to be safely shut down. It has been found that a wait time of around 4–5 seconds is suitable.

At the end of the wait period, the AC line is rechecked in step 510. If power has returned, control returns to step 503 and normal operation of the system resumes. If the AC power has not returned, then the system sends an AC fail signal to the system on line 108.

As previously described, this signal causes a System Controlled Interrupt to which the operating system gives control to the BIOS. The BIOS reacts by requesting the operating system to perform a safe shutdown of the system—step 512. If the computer is in a suspend to RAM mode which requires auxilliary power, then the BIOS will detect the change to SCI register 109 and cause the operating system to first awake the computer to allow it to subsequently pass into a suspend to disk mode which does not require any auxilliary power. This process could take 1–2 minutes to complete.

The safe shutdown, step 512, is completed even if AC power returns during its execution.

At the end of the safe shutdown, both the remote ON signal on line 104 and the signal on line 107 are off. Upon detecting that both these signals are off, the BBU then finally switches the battery discharge off and stops providing power to PSU 20-step 513—in order to preserve the energy in its batteries. This final state means that the computer is not able to restart unless the AC power returns, even if the remote on signal on line 104 is activated.

The truth table of Table 1 summarizes the various states of the system (X means don't care):

TABLE 1

| Psu 20 Present? | BBU on/off switch | AC Input Voltage | Line 108 | Charger | Dis- charger | Operation Mode |
|---|---|---|---|---|---|---|
| No | X | X | X | Disable | Disable | BBU Protection Mode |
| X | OFF | X | X | Disable | Disable | BBU OFF-Mode |
| Yes | ON | Present | High | Enable | Disable | BBU Charge Mode PSU operating from AC-Line |
| Yes | ON | Fail<4s | High | Disable | Enable | Psu operating from BBU |
| Yes | ON | Fail>4s | Low | Disable | Enable | Psu operating from BBU while systems shuts down. |

The possible sequences of operations are summarised in Table 2 and Table 3.

TABLE 2

| Sequence Number | Line 104 | Line 107 | AC-Line | BBU State | System State | Consequence |
|---|---|---|---|---|---|---|
| 1 | OFF | OFF | ON | OFF | OFF | |
| 2 | ON | OFF | ON | OFF | ON | Normal operation |
| 3 | ON | OFF | OFF | Discharger ON | Back-up | PC shut down→ Remote OFF |
| 4 | OFF | OFF | OFF | OFF | OFF | OFF |
| 5 | X | OFF | OFF | OFF | OFF | System does not start up as AC-Line did not come back. |
| 6 | ON | OFF | ON | Charger ON | ON | Normal Operation |

TABLE 3

| Sequence Number | Line 104 | Line 107 | AC-Line | BBU State | System State | Consequence |
|---|---|---|---|---|---|---|
| 1 | OFF | OFF | ON | OFF | OFF |  |
| 2 | ON | X | ON | OFF | ON | Normal operation |
| 3 | X | ON | OFF | Discharger ON | Back-up | PC shut down→ Remote OFF |
| 4 | OFF | OFF | OFF | OFF | OFF | OFF |
| 5 | X | X | OFF | OFF | OFF | System does not start up as AC-Line did not come back. |
| 6 | ON | OFF | ON | Charger ON | ON | Normal Operation |

Usually during a power out, the computer monitor will not be provided with power and therefore will not provide any visual feedback to the user as to what is going on. LEDs are therefore provided on the externally visible front Panel of BBU 50.

A first LED is illuminated when BBU 50 does not contain enough energy to power the system. Second and third LED indicate respectively the presence of AC power and whether or not BBU 50 is on and properly connected to PSU 20.

What is claimed is:

1. A back-up power accessory for storing back-up power for a computer and for providing the computer with said back-up power for a limited period of time upon failure of an AC power supply to the computer, the accessory being electrically connectable to the computer and comprising:
   a first detection mechanism for detecting AC power failure of said computer;
   a second detection mechanism for receiving a suspend signal from the computer which signal indicates that the computer is in a power consuming sleep state;
   a third detection mechanism for receiving an on/off signal from the computer which on/off signal indicates that the computer requires full power; and
   a shutdown mechanism that cooperates with said first, second and third detection mechanisms upon AC power failure and detection of either the suspend signal or the on/off signal to send a fail signal to the computer for causing the computer to perform a safe shut-down.

2. A back-up power accessory as claimed in claim 1 wherein the first detection mechanism includes means to detect AC failures lasting at least a predefined length of time and the shutdown mechanism is arranged to send the fail signal if an AC power failure longer than the predetermined length of time is detected.

3. A back-up power accessory as claimed in claim 1 comprising a connector for providing an electrical connection with a power management control component of the computer, the connector comprising at least a first wire for carrying the suspend signal, a second wire for carrying the on/off signal and a third wire for carrying the fail signal.

4. A back-up power accessory as claimed in claim 3 wherein the connector consists of four wires, including an earth wire.

5. A back-up power accessory as claimed in claim 1 wherein the accessory is physically configured for removable mounting within a computer case.

6. A back up power accessory as claimed in claim 5 wherein said back-up power accessory is shaped and sized like a conventional disk drive accessory and comprises means to fasten the accessory within a conventional disk drive bay of the computer.

7. A back-up power accessory as claimed in claim 1 wherein said back-up power accessory further comprises:
   a power supply connector for electrical connection to an internal power supply of the computer; and
   a third detection mechanism for detecting the presence of said internal power supply, the back up power accessory being arranged to shut off said back-up power if the internal power supply is detected as not being present.

8. A back-up power accessory as claimed in claim 7 wherein the power supply connector is female.

9. A computer system for use with a back-up power accessory as claimed in claim 1, the system comprising presence detect means to detect the presence of the back-up power accessory within the system and configuration means to configure a power management control component to receive said fail signal.

10. A computer system as claimed in claim 9 wherein the presence detect means and the configuration means are implemented at least in part by a BIOS program.

11. A back-up power accessory as claimed in claim 2 wherein said back-up power accessory further comprises:
   a power supply connector for electrical connection to an internal power supply of the computer; and
   a third detection mechanism for detecting the presence of said internal power supply, the back-up power accessory being arranged to shut off said back-up power if the internal power supply is detected as not being present.

12. A back-up power accessory as claimed in claim 1, wherein the power consuming sleep state is a suspend to RAM state.

13. A back-up power accessory as claimed in claim 12, wherein causing the computer to perform a safe shut-down comprises changing the suspend to RAM state to a suspend to disk sate.

14. A computer system with a back-up power accessory, the back-up power accessory comprising:
   a first detection mechanism for detecting AC power failure of said computer system;
   a second detection mechanism for receiving a suspend signal from the computer system, which signal indicates that the computer system is in a power consuming sleep state;
   a third detection mechanism for receiving an on/off signal from the computer system, which on/off signal indicates that the computer system requires full power; and
   a shutdown mechanism that cooperates with said first, second and third detection mechanisms upon AC power failure and detection of either the suspend signal or the on/off signal to send a fail signal to the computer system for causing the computer system to perform a safe shutdown;
   wherein the computer system comprises presence detect means to detect the presence of the back-up power accessory within the computer system and configuration means to configure a power management control component to receive said fail signal.

15. The computer system of claim 14, wherein the presence detect means and the configuration means are implemented at least in part by a BIOS program.

* * * * *